US006865670B2

(12) United States Patent
Yu et al.

(10) Patent No.: US 6,865,670 B2
(45) Date of Patent: Mar. 8, 2005

(54) METHOD AND APPARATUS FOR ENABLING A COMPUTER SYSTEM

(75) Inventors: Dean T. Yu, Cupertino, CA (US); Christopher S. Derossi, San Jose, CA (US)

(73) Assignee: Apple Computer, Inc., Cupertino, CA (US)

(*) Notice: Subject to any disclaimer, the term of this patent is extended or adjusted under 35 U.S.C. 154(b) by 390 days.

(21) Appl. No.: 10/028,363

(22) Filed: Dec. 21, 2001

(65) Prior Publication Data

US 2002/0138720 A1 Sep. 26, 2002

Related U.S. Application Data

(63) Continuation of application No. 08/558,929, filed on Nov. 13, 1995, now Pat. No. 6,430,685, which is a continuation of application No. 08/019,599, filed on Feb. 19, 1993, now abandoned.

(51) Int. Cl.[7] .............................. G06F 9/24; G06F 9/445
(52) U.S. Cl. ............................... 713/2; 713/1; 713/100; 718/100; 718/102
(58) Field of Search ........................ 718/100, 102, 718/101, 103, 104, 105, 106, 107; 713/1, 2, 100; 710/10; 717/156, 168

(56) References Cited

U.S. PATENT DOCUMENTS

| | | | | |
|---|---|---|---|---|
| 3,618,045 A | * | 11/1971 | Campbell | 395/650 |
| 4,493,034 A | * | 1/1985 | Angelle et al. | 713/100 |
| 4,558,413 A | * | 12/1985 | Schmidt et al. | 707/203 |
| 4,620,273 A | * | 10/1986 | Mitani et al. | 364/136 |
| 4,626,986 A | * | 12/1986 | Mori | 395/700 |
| 4,654,783 A | * | 3/1987 | Veres et al. | 364/200 |
| 4,833,594 A | * | 5/1989 | Familetti et al. | 713/1 |
| 5,128,995 A | * | 7/1992 | Arnold et al. | 713/1 |
| 5,134,580 A | * | 7/1992 | Bertram et al. | 713/1 |
| 5,214,771 A | * | 5/1993 | Clara et al. | 710/10 |
| 5,261,104 A | * | 11/1993 | Bertram et al. | 713/1 |
| 5,278,973 A | * | 1/1994 | O'Brien et al. | 717/168 |
| 5,291,585 A | * | 3/1994 | Sato et al. | 710/10 |
| 5,313,626 A | * | 5/1994 | Jones et al. | 395/575 |
| 5,325,430 A | * | 6/1994 | Smyth et al. | 380/4 |
| 5,459,854 A | * | 10/1995 | Sherer et al. | 713/1 |
| 5,586,324 A | * | 12/1996 | Sato et al. | 713/2 |

OTHER PUBLICATIONS

Rose, Philip F.H., The Macintish Finder—Pure GUI, PC Magazine Jul. 12, 1989 v8 n15 p 133(4).*
Wiggins, Robert R., Vnemotionitz Instability, Mac User 6/90 v6 n6 p 29 (1).*

* cited by examiner

Primary Examiner—Majid A Banankhah
(74) Attorney, Agent, or Firm—Blakely, Sokoloff, Taylor & Zafman LLP (57) ABSTRACT

A system and method for utilizing generic computer operating system software for computer hardware systems designed subsequent to the operating system software. The system and method of the present invention employs a separate modular software file called a System Enabler that has all patches, code, data and resources needed to make a particular computer system operational. The System Enabler file is matched to a particular hardware system and may be bundled with that hardware system. During computer system start up the System Enabler file modifies the generic operating system software for optimum operation with the particular computer hardware system.

34 Claims, 5 Drawing Sheets

METHOD AND APPARATUS FOR ENABLING A COMPUTER SYSTEM

The present patent application is a Continuation of prior application Ser. No. 08/558,929, filed Nov. 13, 1995, entitled A METHOD AND APPARATUS FOR ENABLING A COMPUTER SYSTEM, now U.S. Pat. No. 6,430,685 which is a continuation of prior application Ser. No. 08/019,599 filed Feb. 19, 1993 now abandoned.

CROSS REFERENCE TO RELATED PATENT APPLICATIONS

This patent application is related to U.S. Ser. No. 08/019,600 filed concurrently herewith, for a "A Method and Apparatus for Overriding Resource Maps in a Computer System" by Dean Yu and Chris Derossi, attorney docket number 2827-38027(P946), which is hereby incorporated by reference.

DOCUMENTS INCORPORATED BY REFERENCE

The following documents are herein incorporated by reference: *Inside the Macintosh*, Volume IV, Addision-Wesley Publishing Company, Inc. (1987); and *Apple Macintosh Family Hardware Reference*, Addison-Wesley Publishing Company, Inc. (1988).

BACKGROUND OF THE INVENTION

1. Field of the Invention

This invention relates generally to computer operating systems boot sequence and initialization methods and apparatus.

2. Summary of the Related Technology

System Software as it's developed today is tied very closely with the particular Macintosh machines that it supports. In some cases, this makes a lot of sense since the system software has to interface with the hardware. In other cases, though, this is an artificial limitation. For example, System 6.0.5 doesn't support the Macintosh Classic because the Classic was released after System 6.0.5. However, since the Classic is so similar to previous machines, namely the Macintosh SE, System 6.0.5 would work just fine if it weren't for the check made by the boot code that prevents it from loading.

Frequently there will be changes to the hardware which require changes to the system software. In many cases, the changes needed in the system software are minor compared to the task of developing and releasing an entirely new version. But, in the past, there was no way to provide incremental changes without releasing a whole new version of system software. Thus, each new set of machines required a complete and separate software development effort.

Hardware support releases of system software are released later, and have higher versions numbers than the version on which the release was based. Customers perceive that the hardware support version is superior because it has a higher version number. Customers then want the newer version, even if they do not have one of the new machines that require the new software. Exacerbating the matter is the fact that hardware support releases often supply additional functionality, causing developers and customers to want the new release for all machines. Hardware support features are required by new machines, thus new software releases are required to implement small human interface elements. For example, System 6.0.5 could not ship with Classic because "About the Finder. . . " would have called it a Macintosh SE and given it the wrong icon.

In the past, operating systems were developed with a particular processor and hardware environment in mind. System designers tailored the operating system to run on a particular processor and hardware configuration. While it has been considered good programming design methodology to take advantage of the underlying hardware architecture, the operating system was limited to the particular processor and hardware environment for which it was written. The operating systems were not portable. This was so because the operating system software had to interface with and control the computer system hardware. Although such operating systems may have operated satisfactorily on one particular type of processor, they would not run on another type of processor. As a result, prior operating systems were inflexible.

In the past, an entirely new version of the operating system software usually had to be developed for each new type machine. An individual development effort was required to code and release a new version of the operating system whenever a new processor or hardware configuration change was implemented. Such development efforts were usually very expensive and time consuming.

In order for the operating system to accommodate different hardware environments, system designers were usually forced to release a new version of the operating system when new hardware platforms became available. Many times, it did not take long for the latest version of an operating system to be upstaged by a newer version generated to accommodate a new hardware configuration. As an undesirable result of this, different versions of the same operating systems would proliferate.

Even in the absence of new hardware platforms using new machine designs, there were other changes in hardware that required changes to the system software. In many cases, the changes to the hardware were relatively minor compared to the task of developing and releasing an entirely new version of the operating system software. Nevertheless, these ad hoc efforts at system design negatively impacted engineering resources, quality control, marketing, and profitability. The proliferation of different versions of an operating system created significant difficulties for those attending to version control and documentation. The problems normally encountered in debugging software and beta testing were greatly exacerbated by the proliferation of different versions of operating system software.

In the past, attempts have been made to extend the functionality of an operating system software release by patching or implementing new functions. These functionally extensible patch files were sometimes referred to as "extensions." For example, to add new functionality that allows an application program to play movies within a document, an attempt might be made to extend the system software functionality with an extension file. Extensions were sometimes referred to as "INIT" files, because of their file type in the Macintosh computer environment provided by Apple Computer, Inc. Extension files were patch files that relied on the system boot routine to bring up the system from a power on reset state to a fully operational state.

Patch files contained changes to system software that were called in and executed to augment system software after system initialization by the boot routine. These patch files would change code in the operating system to accommodate new machines, new hardware configurations, and to update system software in order to fix problems or add functionality after the release of a particular version of an operating system.

In addition to the above described problems, application programs that were written to run on a particular hardware platform might not run on later versions of the hardware, because the application program might not be compatible with the new version of the operating system required for a new hardware configuration different from that on which the application program was originally designed to run.

Further problems were created because the way that system programmers dealt with the inherent incompatibility between most underlying hardware architecture's sometimes had the undesirable result of imposing artificial limitations on the software. Typically, a status check of the hardware configuration would be performed by the operating system during the system start-up, or boot procedure. Oftentimes, an operating system designed to run on a first hardware platform would be prevented from loading onto a second slightly different platform, when the status check determined that the hardware platform was not the one that the operating system expected. The system would halt, even though the operating system might be capable of actually running on that slightly different hardware platform. Thus, the artificial barrier created by the common practice of performing such status checks would make operating systems that were designed to run on a particular hardware platform incompatible with any different hardware platform, regardless of the similarities between the two hardware platforms. Nevertheless, such status checks were often considered to be a necessity in order to prevent computer system crashes, because of the lack of portability between most hardware platforms.

Customers were often confused when numerous ad hoc versions of system software appeared on the market with higher version numbers than the one the customer had just purchased. Customers typically perceived software having a higher version number to be superior over software with a lower version number, even though the difference in version was only to accommodate hardware which the customer did not utilize. This practice also tended to raise customer concerns as to why frequent software revisions were being released.

The system software vendor must test its latest released version of operating system software with all existing computer hardware, past and present. Of course, as the number of different hardware systems increases, so does the requirement for software testing of new system software versions.

It is apparent from the above discussion of problems in conventional systems, that there is a need for an improved method and apparatus to accommodate new computer hardware developments with an existing software operating system.

SUMMARY OF THE INVENTION

This invention relates generally to the concept of using modularized software with new computer systems and more particularly to a technique that employs a separate modular software file having all patches, code, data and resources needed to initialize a particular computer system.

The present inventors have developed new operating system architectures that are designed to solve these problems. Portions of the boot or start-up routine have been moved out of read only memory (ROM) and into files so that the boot routine is no longer hard coded and inflexible. As much of the boot procedure as possible is located in a file on disk instead of ROM so that the boot procedure can be changed by providing a new boot procedure file on disk.

The present invention provides a method and apparatus for updating existing computer operating system software so that the existing version of the system software will operate with and utilize new functionalities and developments in computer operating system and the underlying computer hardware architecture. The method and apparatus of the present invention utilizes software modules, referred to as a "System Enabler" or "Gibbly", which is specific to a particular computer system's implementation in hardware and software. Whenever a new computer system is introduced, the correct new version of a software module is also included with the computer system. The operating system software of the present invention utilizes a separate file which contains all of the patches, code, data and resources needed to utilize specific new hardware. This file is called the "System Enabler" or "Gibbly".

By removing the hardware specific knowledge from the operating system software, a new version of the operating system software is not required every time new hardware is utilized in a computer system. Instead, the present invention allows the most recent generic version of a software operating system to be utilized with subsequently introduced computer hardware systems by supplying the appropriate System Enabler with the new computer system.

The present invention reduces the number of new versions of operating system software required to support new computer system hardware. The present invention permits hardware specific changes to be made to the operating system software early in the boot process.

A feature of the present invention is the ability to boot new hardware implementations developed subsequently to the current operating system software. Another feature of the present invention is use of the most recent time stamped Gibbly, or some other selection criteria such as machine state, operating mode, or other criteria to select the most appropriate Gibbly for starting up the computer system.

Other and further features and advantages will be apparent from the following description of a presently preferred embodiment of the invention, given for the purpose of disclosure and taken in conjunction with the accompanying drawings.

DETAILED DESCRIPTION OF THE PREFERRED EMBODIMENT

A better understanding of the present invention will be obtained when the following detailed description is read with reference to the drawings where common elements are designated with like numbers or letters and similar elements are designated with like numbers or letters followed by a lower case letter. The system and method of the present invention utilizes a generic software operating system to be used with subsequently released computer systems using newly designed hardware.

Overview of a Preferred Embodiment

A computer system comprises a processor, random access memory (RAM), read only memory (ROM), nonvolatile memory storage devices (hard disk) and user input-output interfaces (keyboard and video display). Nonvolatile memory is used to store software programs, for example, the operating system and application programs. The ROM stores instructions that cause the processor to run system diagnostic tests then transfer program information stored in the nonvolatile memory to RAM. Once the operating system and other required software resources have been transferred to RAM, the processor begins executing the instructions stored in the RAM.

Preferably, as the computer system hardware begins initialization in the power-on reset or user initiated mode, the hardware start up process, common referred to as a boot routine, the generic software operating system searches for the current System Enabler or Gibbly that is programmed to boot the corresponding specific hardware system. Normally, a computer system starts the operating system boot sequence from instructions located in its ROM. The ROM resident instructions direct the processor of the computer system to continue booting from instructions located in boot code in the RAM associated with the computer hardware. These boot instructions located in RAM may then call the appropriate System Enabler or Gibbly to complete the correct boot program for the specific hardware system. Thus the boot routine can be updated by providing a new System Enabler or Gibbly file to be executed by the boot routine during system initialization.

The specific software mechanism of the System Enabler may be called hereinafter a "Gibbly". A Gibbly may be thought of as a program that is capable of booting one or more machines. The system software selects the most appropriate Gibbly and allows the selected Gibbly to boot the computer system.

A summary of the preferred embodiment of the present invention will be described for an Apple (R) Macintosh (R) computer system. A more complete description of the Macintosh computer hardware and software systems is illustrated in "Inside Macintosh" by Apple Computer, Inc., Addison-Wesley Publishing Company (2d Ed. 1992) and incorporated herein by reference for all purposes.

In the preferred embodiment, the Gibbly of the present invention may exist in the System file, in the computer system ROM, or in a separate file in the System Folder. The Gibbly preferably resides in the System Folder for booting up the computer system. The preferred Gibbly contains a resource which specifies which computer systems the Gibbly is capable of booting. Preferably, the Gibbly also has a time stamp which allows the system software of the present invention to utilize the Gibbly with the most recent time-date stamp for booting purposes if more than one Gibbly is present. The appropriate Gibbly selection process may be based upon criteria other than the time-date stamp. The Gibbly may contain other selection criteria comprising machine state, operating mode, preference file, or other criteria describing the machine, its hardware, or the preferred initial operating state.

In the preferred embodiment, the operating system software is generic in that the same system software may be utilized with a general class of past, present, and future computer systems. Preferably, there is enough commonalty in the general class or family of computer systems so that the general functionality of the generic system software does not materially change between members of the class. Specific enhancements in new computer system software and hardware, however, may be outside of the general class and may require special purposed programs to fully utilize the enhanced features of the new hardware.

The present invention utilizes existing and proven operating system software and modifies it or adds special instructions to take best advantage of new hardware developments and architectures as they become integrated into new computer systems added to the general class of computer systems to which a generic operating system applies. The improved method and apparatus of the present invention utilizes a System Enabler or Gibbly that contains the hardware specific instructions for each type of computer system in the general class. The generic software operating system passes control to the System Enabler or Gibbly during system start up or boot so that the hardware specific instructions may be implemented.

The Gibbly of the present invention contains a list of computer systems that it has knowledge of, and also, the Gibbly includes a time-date stamp. The list of computer systems allows the Gibbly to act on computer systems for which the Gibbly was designed. The time-date stamp allows the resident operating system program to select the most recent Gibbly. Gibblies may reside in the computer system ROM, with the operating system in the system file, or exist as separate programs introduced as new Gibbly files distributed after both the computer system hardware and operating system software are installed and operational.

In the preferred embodiment, the operating system selects the most appropriate Gibbly based on the most recent time-date stamped Gibbly that has knowledge of the particular machine that the operating system is trying to boot. The machine may be located on a network and a Gibbly may be associated with other machines on the network. Because the Gibbly operates each time the computer system starts up, new Gibblies, having enhanced features, may be added subsequent to existing installed Gibblies. More than one Gibbly may exist in the computer system ROM, operating system software, or added resource file, but only the latest time-date stamped Gibbly will be utilized during system start up, thus, insuring that the latest hardware implementations are utilized.

The Gibbly mechanism is designed to solve the problems encountered with past systems as discussed above. The present invention reduces the effort required to support new machines, by allowing incremental changes to the system software to be performed outside of the base system software. Thus only the incremental changes require additional development and testing. The incremental changes required for new machines do not execute on older machines, thus system developers do not have to test an incremental change to system software on the older systems that do not utilize the change. Instead, developers can concentrate on testing the new software with the new machines.

The present invention provides an improved method and apparatus that supports changes to low-level system software. In order for the Gibbly mechanism to be successful, it supports the kinds of changes that are required by new hardware. The existing extension (INIT) mechanism will not work because it doesn't allow low-level changes to be applied early enough in the boot process. The present invention reduces the amount of effort required to support new computer system hardware by allowing incremental changes specific to the new hardware be added to the operating system software without having to modify or retest the underlying generic operating system software.

The Gibbly architecture leverages off of resource overrides described in the patent application entitled A Method and Apparatus for Overriding Resource Maps in a Computer System, filed concurrently herewith. The resource override architecture is one of the foundational architectures for the Gibblies.

In the preferred embodiment, after a power-on reset or a user initiated reset, the system boot process initializes the computer system to its proper initial operating state. The initial operating state will depend on the available peripherals and central processing unit. A Gibbly may exist in the system file, in ROM, or as a separate file from the system file. The system boot file will determine whether to continue booting with the remainder of the boot file contained in the system file or another file, or to go to an external Gibbly to continue the boot process.

The initial portion of the boot procedure is contained in ROM, after which the ROM routine reads in the remainder of the boot code from disk. The Gibbly will install additional patches and features that the specific machine will require. A specific Gibbly is customized to boot a particular machine or set of machines. The Gibbly allows the system to boot or initialize and work properly.

In the preferred embodiment, the earliest stages of the boot process are carried out by the ROM in the Macintosh. As soon as possible, the boot process is handed over the system software on disk. Since the system software was created more recently, it is assumed to have more knowledge about what needs to be done. Gibblies takes this idea one step further.

A Gibbly is an entity that knows how to boot one or more machines. By default, there's a Gibbly in the System itself which knows how to boot the particular machine and other machines similar to it. Instead of always taking the boot process upon itself, as is done today, the System will locate the most recent Gibbly and allow it to boot the Macintosh. The concept is the same as with the ROM and system software, the most recent Gibbly code has more knowledge about what needs to be done.

Booting with Gibblies

A Gibbly may exist in one of three places: the System file itself, the ROM, or in a separate file in the System Folder for flexibility. A Gibbly may be placed in ROM to complete a boot process in ROM. The Gibbly may exist in the system file, in which the entire file contains enough information to boot the machine. There may be also a system enabler file, the Gibbly, shipped with new machines. Thus when new versions of the system software are released, the functionality contained in the separate file can be combined into a single file in the system file. The system file can then boot the machine and will not require a system enabler file to boot the machine.

Thus, a new Gibbly will supersede the old Gibbly and thus maintain the entirety of the boot procedure in a single location. To facilitate hardware delivery schedules, new machines can be shipped with separate Gibblies capable of booting the machine. Then as developers add functionality to the system software, the new Gibblies will be developed and shipped which are capable of booting machines that were shipped after the original Gibblies. Thus, these new Gibblies will supersede those Gibblies that were first shipped with the machines.

With the new Gibbly in place, the older system software is updated to contain all the new functionalities developed after shipping the older system software. The new Gibbly brings the older system software to the functional level of the newer system software without the need for a new version release.

Preferably, the Gibbly files exist in the System Folder because they are required files for booting. Preferably, as soon as the system software on disk takes over the boot process, it searches for all Gibblies that can boot the machine. Each Gibbly contains an identifier which specifies which computers, for example which Macintoshes in the preferred embodiment, that Gibbly is capable of booting. The Gibbly has an associated time-date stamp. If the system software locates more than one Gibbly that can boot the machine, the system selects the Gibbly with the most recent time stamp to take over the boot process. As discussed above, the appropriate Gibbly may be selected based on other criteria or a combination of criteria existing in the Gibbly.

Preferably, a Gibbly with a later time-date stamp is capable of replacing all prior Gibblies for a particular machine. Preferably, this will not require maintaining a substantial amount of historical information in the Gibbly. Gibblies will take over the boot process without needing any information from older superseded Gibblies. Preferably, System file Gibblies will be able to boot completely on their own. Non-System Gibblies will preferably be compatible with only one previous version of the system software.

For example, a future scenario will preferably occur as follows:

Jan. 1, 1995 System 9.0 released

Feb. 1, 1995 Macintosh IV releases with a new ROM. The ROM Gibbly boots the Mac using resources from itself and from System 9.0.

Mar. 1, 1995 Macintosh Classic III releases with an older ROM. Since there's no ROM Gibbly, a Gibbly file is provided. The Gibbly file boots the Macintosh using resources from itself and from System 9.0.

Jul. 1, 1995 System 9.1 releases. It has a later time-date stamp than either the Mac IV ROM Gibbly or the Classic III file Gibbly, so it boots the Macs, but has incorporated the changes from both Gibblies, so the system software does not need anything but itself to boot. Non-System Gibblies are no longer required for either of these machines.

If the user attempts to boot a machine with a recent Gibbly and old system software, the Gibbly has the option of either dealing with the older system and performing the boot, or telling the user to get the latest version of the System software.

Gibblies should not be considered merely as a new extension mechanism. Gibblies do more than extend the system software by patching the old system software. Gibblies actually perform the boot process without patching the old boot process. Gibblies supersede the older boot process in addition to implementing patches, to correct problems and provide new functionality. Moreover, only one Gibbly will be executed at boot time, and so the Gibbly itself performs the boot process in addition to providing new functionality, thus the Gibbly is more than an extension or patch, it is a self-contained boot routine that initializes the system from its initial power-on reset state to the presentation state where the system presents the greeting to the user and is ready to accept commands from the system user. In the preferred embodiment, the Macintosh environment, the Gibbly brings the system up to the "Finder". The Finder is the Macintosh application that allows a user to manipulate and organize files on disk.

In the past, extensions were provided by INIT files. The boot process was responsible for loading these files and executing the code in these files. The Gibbly also loads and executes files to patch code and provide new functionality. In the preferred embodiment, the Gibbly preferably knows how to boot the system in addition to loading and executing patch files.

The following table illustrates where each part of the boot process may reside.

| Boot Stage | Location of Code | Executed by |
|---|---|---|
| Diagnostics | ROM | ROM |
| Boot Blocks | Disk | System |
| Boot Arbitration | 'boot' 2 | System |
| Main Boot | 'boot' 3 | System, ROM, or Gibbly |

Patching with Gibblies

The majority of the differences between a machine-specific release of System Software and a reference release of System Software exist in the patches that are needed to get a new machine to boot.

In the preferred embodiment, the system software implements new functionality and corrects problems through patches. Each patch routine has an identification number associated with it. Every patch may not apply to a given machine, thus a patch table is provided to instruct the Gibbly which patches not to install for the particular machine. For example, if a patch applies only to a color monitor, a machine with a monochrome monitor would not need to install the color patch. Thus, the color patch would appear in the patch table for the monochrome machine and would not be installed by the Gibbly. Preferably, the size of Gibbly files is minimized.

The key to turning patches on and off is the patch load table. The table specifies ranges of patches to load from a particular set of patches. For each patch entry, the patch loader will see if it is in any of the ranges specified in the patch load table. If it is, it will be made resident in memory and executed. If the entry is not in any of the specified ranges, it will not be loaded or executed.

This mechanism allows a Gibbly to pick and choose which patches to install and in which order. For example, it can load some patches from the base system, then load some more from it's own set of patches, then go back to loading more patches from the system file if it really wanted to. A Gibbly might want to do this if some patches in the System that didn't change for a new machine relied on patches that did change but are loaded before the first set of patches.

Resident Resources

Gibblies preferably add or replace resources. The best example is the 'STR#'-16395 resource which contains a list of the names of all shipping Macintoshes. Chances are, this resource in the base system will not have the name of new machines. Gibblies for these machines will want to replace this resource with a new one that contains the name of the new machine.

Illustrative Example of a Preferred Embodiment of the Invention

Figure 1:
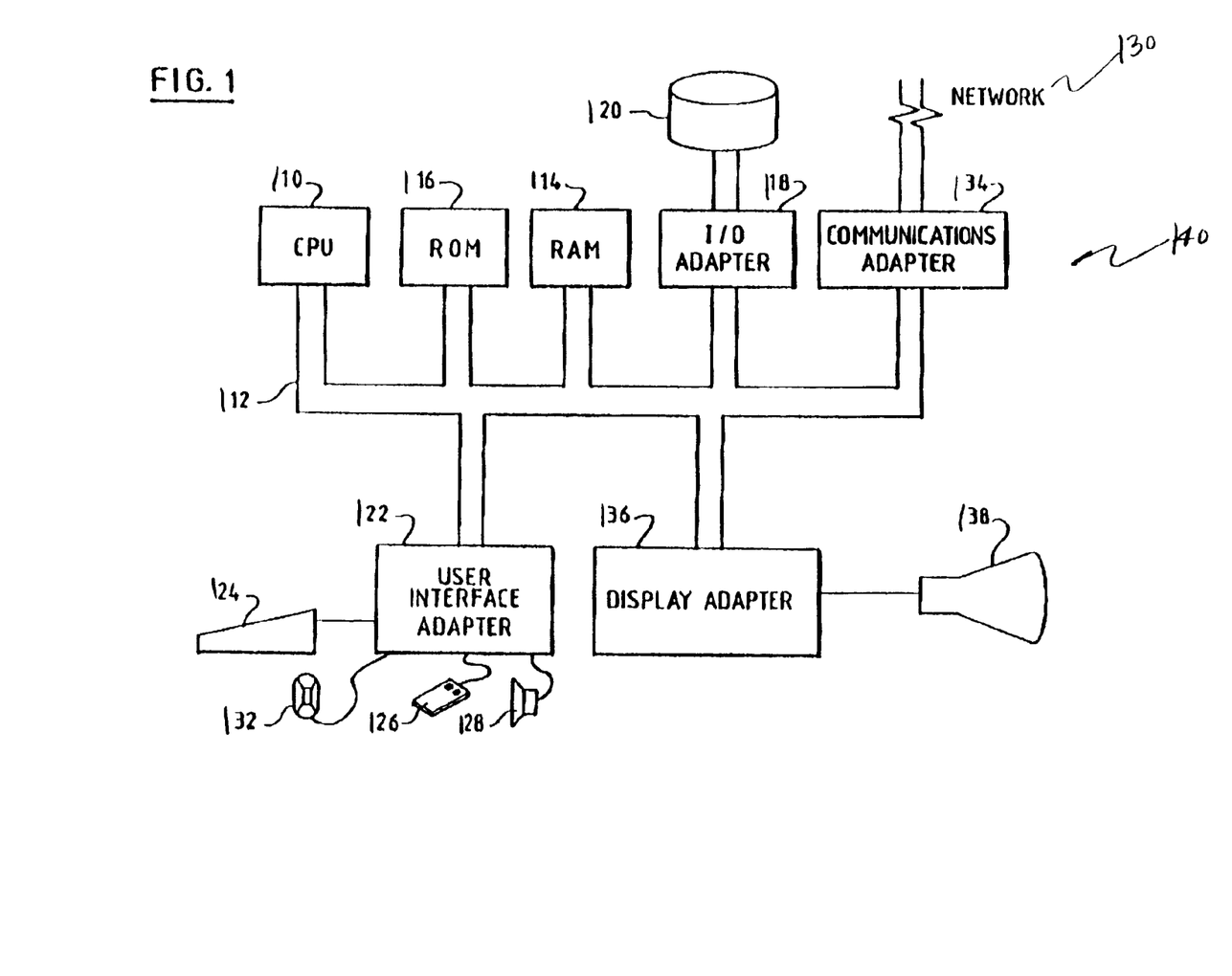
FIG. 1 is a schematic block diagram of a computer system in accordance with the present invention.

In the drawings the number 140 designates generally a computer system. A representative hardware environment for the present invention is depicted in FIG. 1 which illustrates a suitable hardware configuration of a computer system 140 in accordance with the present invention.

The computer system 140 has a central processing unit 110, such as a conventional microprocessor, and a number of other devices interconnected via a computer system bus 112. The computer system 140 comprises a random access memory 114 (RAM), a read only memory 116 (ROM), an I/O adapter 118 for connecting peripheral devices such as nonvolatile memory devices such as disk units 120 to the bus 112, a user interface adapter 122 for connecting a keyboard 124, a mouse 126, a speaker 128, a microphone 132, and/or other user interface devices (not illustrated) to the bus 112. The computer system 140 may also have a communications adapter 134 for connecting the bus 112 to a data processing network 130 and a display adapter 136 for converting the display information from the bus 112 to video information to drive a display device 138.

Figure 2:
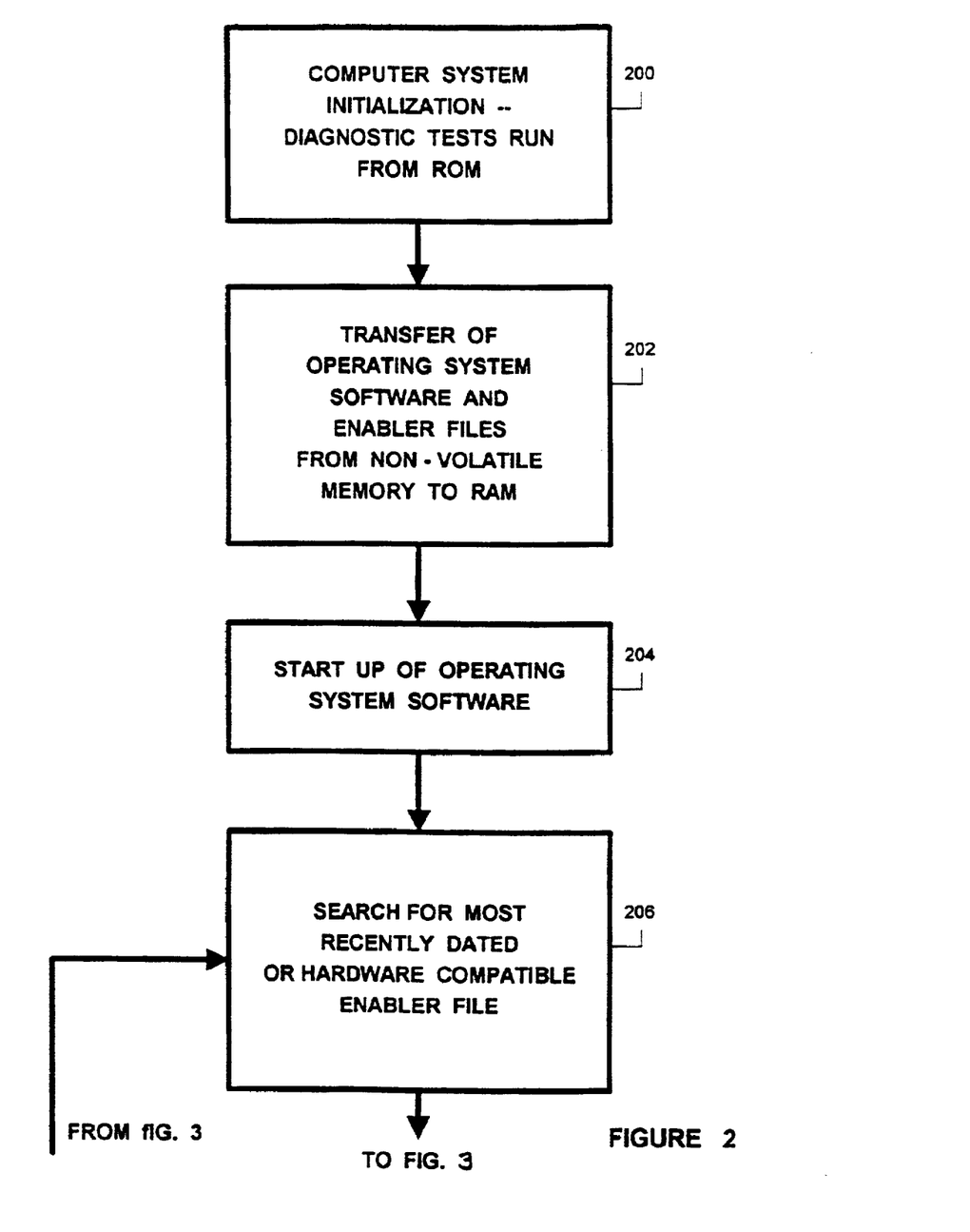
FIGS. 2–5 are flow charts in accordance with the present invention.
Figure 3:
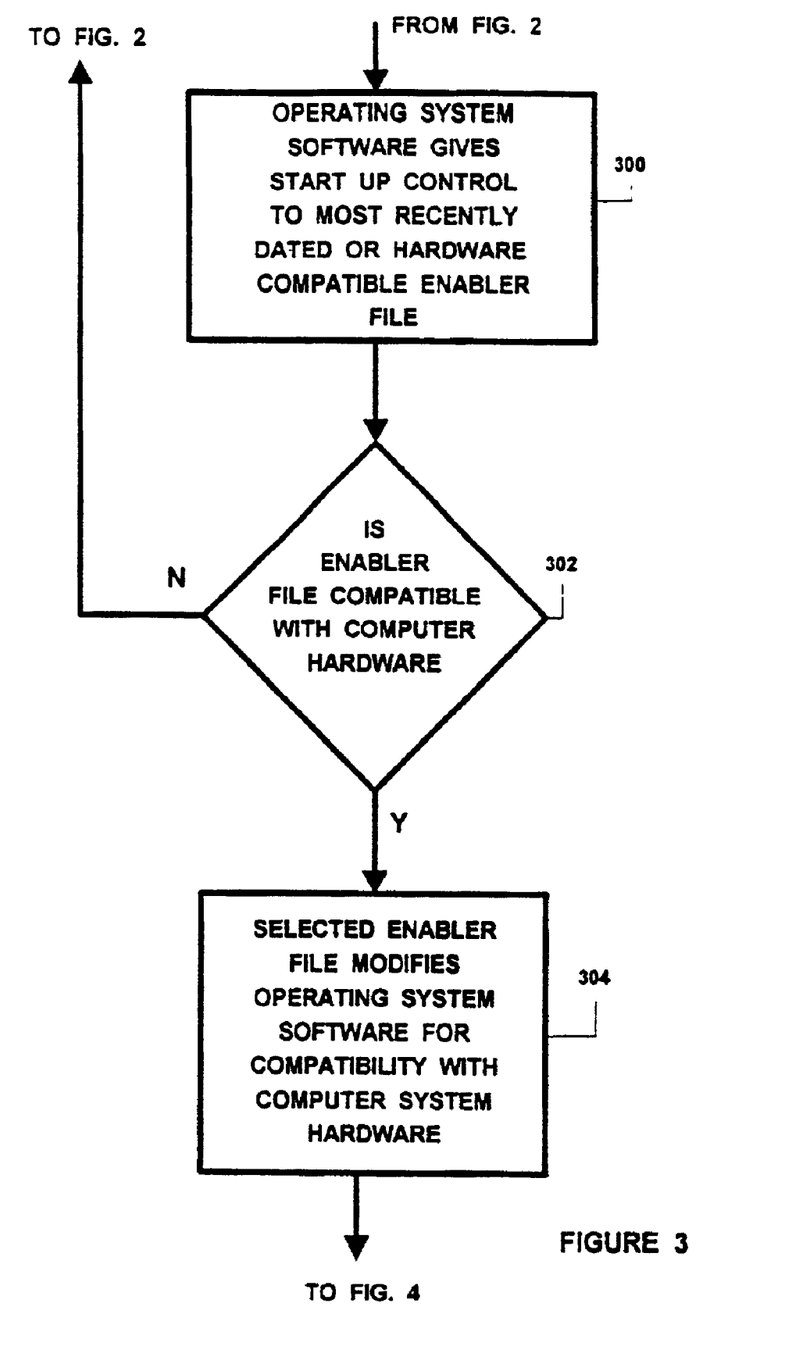
Figure 4:
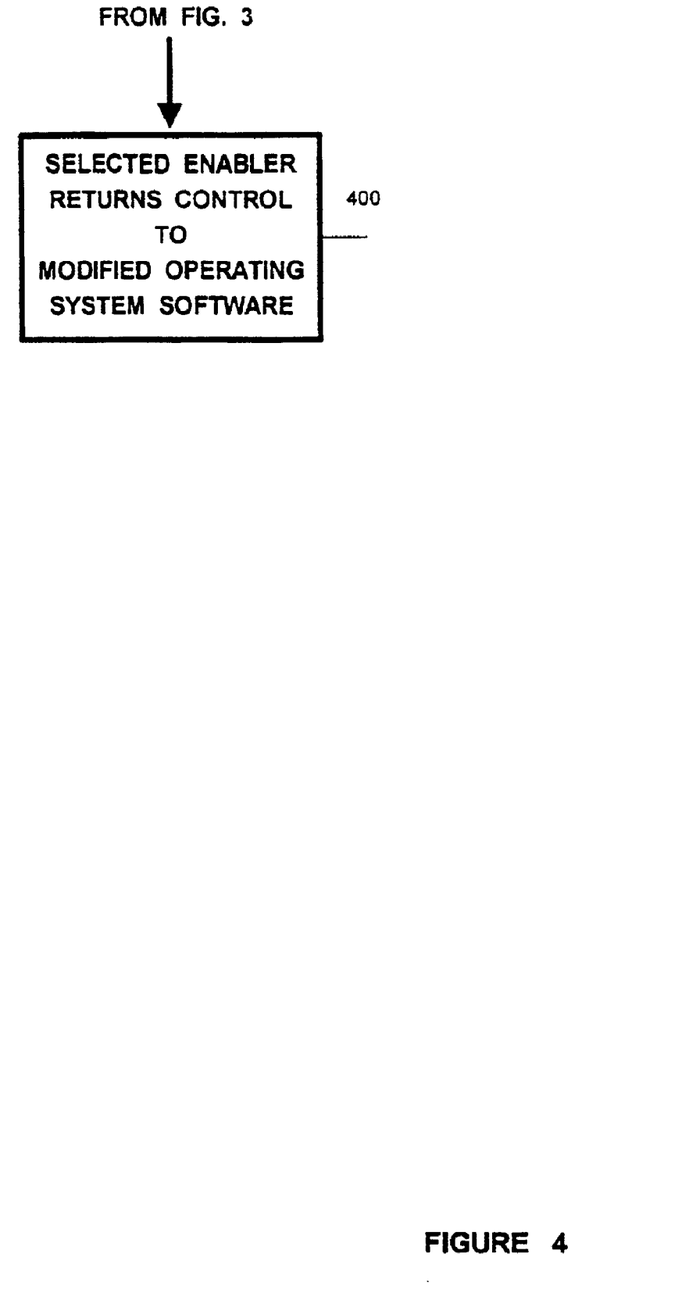
Figure 5:
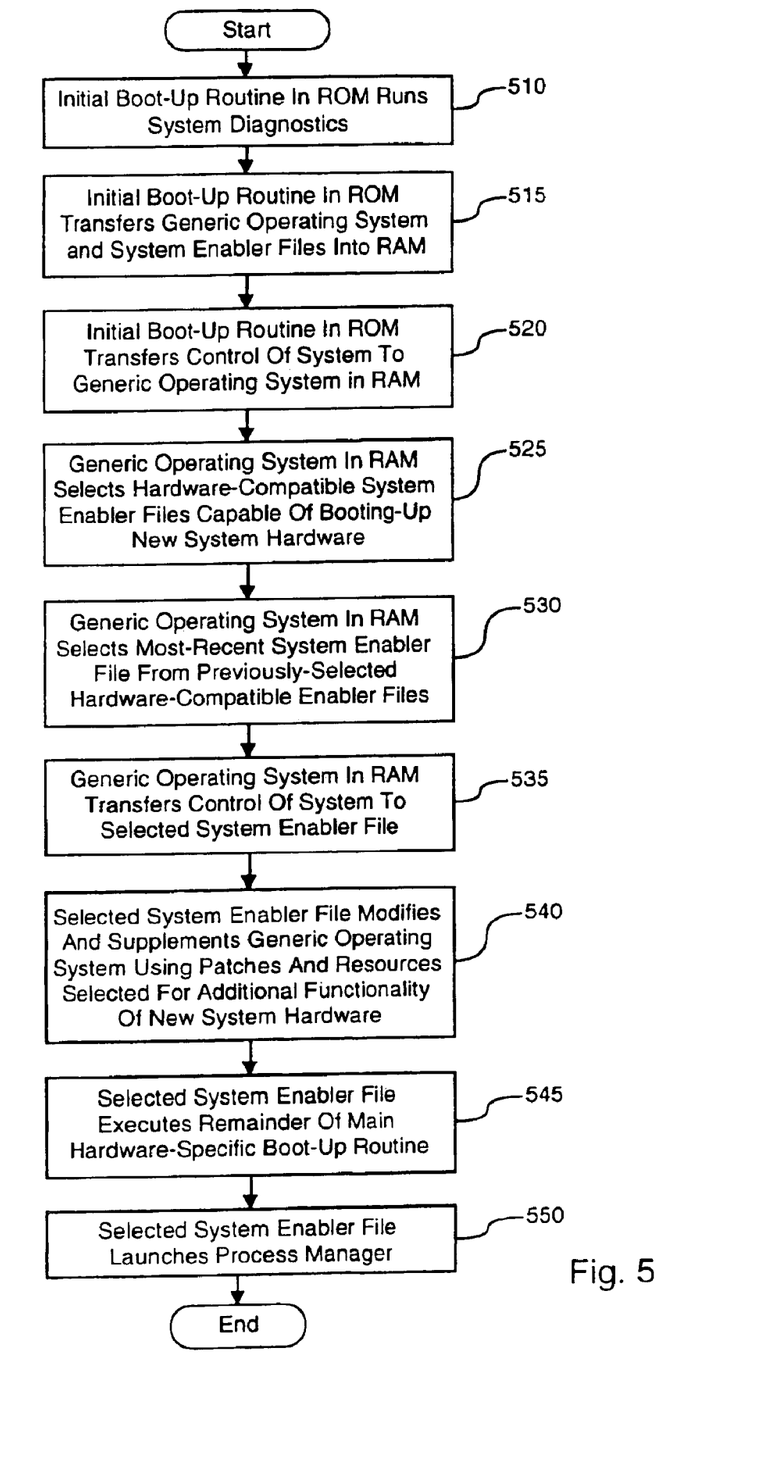

Referring now to FIGS. 2–4, flow charts of the present invention are schematically illustrated. When the computer system 140 is initially started by turning power on or during a system reset, a hardware diagnostic test is run on the entire computer system 140 from program instructions located in the ROM 116. Function block 200 illustrates this diagnostic test. Upon successful completion of the hardware diagnostic tests, subsequent instructions in the ROM 116 cause the processor 110 to transfer operating system software and system enabler files from hard disk 120 to the RAM 114. This transfer is illustrated by function block 202.

Once the software files are transferred from the disk 120, the program residing in the ROM 116 transfers control to the operating system software now in the RAM 114. This transfer of program control is illustrated in function block 204. One of the first things that the operating system software does is cause the processor 110 to look for the most appropriate system enabler file that is compatible with the hardware of the computer system 140. This is illustrated by function block 206.

When the most compatible system enabler is located, the operating system software gives up its control of the processor 110. As illustrated in function block 300 and decision block 302, the enabler file must be compatible with the hardware of the system 140.

There may be more than one System Enabler file or Gibbly present in the computer system 140. A Gibbly may be programmed into the ROM 116 at time of manufacture of the computer system 140. A Gibbly may be part of the operating system software by incorporating the Gibbly at the time of software manufacture, or the Gibbly may be a separately loaded resource file added subsequent to both the hardware and operating system software releases.

Thus, there may be more than one Gibbly present in a computer system 140 and its RAM 114 or ROM 116. The present invention searches for all Gibblies that can start up (boot) the hardware of the computer system 140. The Gibbly has a resource which specifies which computer system 140 the Gibbly may start up. The Gibbly also has other data such as a time-date stamp, on which a compatibility determination may be made, thus, the operating system resource manager may easily determine the most appropriate Gibbly to utilize in starting up the computer system 140 by using, for example, the latest time-date stamped Gibbly having the correct resource ID.

Once the correct Gibbly is selected by the operating system software, the selected Gibbly takes over control of the processor 110 of the computer system 140. After control is with the selected Gibbly, the Gibbly will modify the operating system software and any other software the Gibbly is programmed to modify. This step is illustrated in function block 304. The Gibbly modifies the appropriate software for best compatibility with the host computer system 140 so that maximum use is made of any new hardware or software technology designed subsequent to the generic operating system software.

Once the selected Gibbly finishes the boot process it launches the process manager. New Gibblies may be added at any time during the life of the computer system. For example, when a new hardware upgrade is incorporated into the computer system 140 a new Gibbly supporting the hardware upgrade can be installed into the system folder file. The new hardware upgrade used in conjunction with the existing computer system 140 and operating system software will be accommodated whenever the computer system is once again initialized, as illustrated in FIG. 2, block 200.

While the invention has been described in terms of a preferred embodiment in a specific system environment, those skilled in the art recognize that the invention can be practiced, with modification, in other and different hardware and software environments within the spirit and scope of the appended claims.

Having thus described our invention, what we claim as new, and desire to secure by Letters Patent is:

1. A method to boot a computer system, the method comprising:

selecting a hardware-specific boot routine designed to boot current hardware of the computer system in executing a generic operating system, the hardware-specific boot routine being initially stored in a read-write memory device such that when hardware of the computer system is changed an updated hardware-specific boot routine can be installed in the read-write memory device to boot the computer system; and executing the hardware-specific boot routine to enable the generic operating system to boot the current hardware of the computer system.

2. A method as in claim 1, wherein when executed the hardware-specific boot routine patches the generic operating system for compatibility with the current hardware of the computer system in executing the hardware-specific boot routine.

3. A method as in claim 1, wherein the hardware-specific boot routine is contained in a system enabler file in the read-write memory device.

4. A method as in claim 3, wherein said selecting the hardware-specific boot routine comprises:

selecting second at least one boot routine from first at least one boot routine, the second at least one boot routine being compatible with the current hardware of the computer system; and selecting the hardware-specific boot routine from the second at least one boot routine based upon a set of defined selection criteria.

5. A method as in claim 4, wherein said set of defined selection criteria includes at least one of:

a) a time-date stamp;
    b) a current machine state of the computer system;
    c) a preference file; and
    d) a preferred initial operating state of the computer system.

6. A method as in claim 4, wherein each of the first at least one boot routine is stored in a system enabler file.

7. A method as in claim 4, further comprising: searching the read-write memory device for the first at least one boot routine.

8. A method to update a computer operating system to control a computer system, the method comprising:

installing an updated hardware-specific boot routine in a read-write memory device;

wherein, during a boot process of executing a generic operating system, the updated hardware-specific boot routine is automatically selected and executed to complete the boot process.

9. A method as in claim 8, wherein the updated hardware-specific boot routine is installed for booting updated hardware of the computer system.

10. A method as in claim 8, wherein said installing the updated hardware-specific boot routine comprises:

replacing an hardware-specific boot routine with the updated hardware-specific boot routine.

11. A method as in claim 8, wherein said installing the updated hardware-specific boot routine comprises:

adding an updated enabler file into the read-write memory device to coexist with a different enabler file in the computer system, the updated enabler file containing the updated hardware-specific boot routine.

12. A method as in claim 8, wherein the updated hardware comprises a CPU and peripherals; and wherein the updated hardware-specific boot routine is selected depending upon the CPU and the peripherals in the boot process.

13. A method as in claim 8, wherein when executed the updated hardware-specific boot routine patches the generic operating system for compatibility with current hardware of the computer system.

14. A machine readable medium containing executable computer program instructions which when executed by a computer system cause said system to perform a method to boot the computer system, the method comprising:

selecting a hardware-specific boot routine designed to boot current hardware of the computer system in executing a generic operating system, the hardware-specific boot routine being initially stored in a read-write memory device such that when hardware of the computer system is changed an updated hardware-specific boot routine can be installed in the read-write memory device to boot the computer system; and executing the hardware-specific boot routine to enable the generic operating system to boot the current hardware of the computer system.

15. A medium as in claim 14, wherein when executed the hardware-specific boot routine patches the generic operating system for compatibility with the current hardware of the computer system in executing the hardware-specific boot routine.

16. A medium as in claim 14, wherein the hardware-specific boot routine is contained in a system enabler file in the read-write memory device.

17. A medium as in claim 16, wherein said selecting the hardware-specific boot routine comprises:

selecting second at least one boot routine from first at least one boot routine, the second at least one boot routine being compatible with the current hardware of the computer system; and selecting the hardware-specific boot routine from the second at least one boot routine based upon a set of defined selection criteria.

18. A medium as in claim 17, wherein said set of defined selection criteria includes at least one of:

a) a time-date stamp;
    b) a current machine state of the computer system;
    c) a preference file; and
    d) a preferred initial operating state of the computer system.

19. A medium as in claim 17, wherein each of the first at least one boot routine is stored in a system enabler file.

20. A medium as in claim 17, wherein the method further comprises: searching the read-write memory device for the first at least one boot routine.

21. A machine readable medium containing executable computer program instructions which when executed by a computer system cause said system to perform a method to update a computer operating system to control the computer system, the method comprising:

installing an updated hardware-specific boot routine in a read-write memory device;

wherein, during a boot process of executing a generic operating system, the updated hardware-specific boot routine is automatically selected and executed to complete the boot process.

22. A medium as in claim 21, wherein the updated hardware-specific boot routine is installed for booting updated hardware of the computer system.

23. A medium as in claim 21, wherein said installing the updated hardware-specific boot routine comprises:

replacing an hardware-specific boot routine with the updated hardware-specific boot routine.

24. A medium as in claim 21, wherein said installing the updated hardware-specific boot routine comprises:

adding an updated enabler file into the read-write memory device, the updated enabler file containing the updated hardware-specific boot routine.

25. A medium as in claim 21, wherein the updated hardware comprises a CPU and peripherals; and wherein the updated hardware-specific boot routine is selected depending upon the CPU and the peripherals in the boot process.

26. A medium as in claim 21, wherein when executed the updated hardware-specific boot routine patches the generic operating system for compatibility with current hardware of the computer system.

27. A computer system, comprising:

a processor; and memory coupled to the processor, the memory comprising a read-write memory device, the memory storing a generic operating system, the read-write memory device storing first at least one boot routine, in a boot process the processor executing the generic operating system to select from the first at least one boot routine a hardware-specific boot routine designed to boot current hardware of the computer system, the hardware-specific boot routine being initially stored in the read-write memory device such that when hardware of the computer system is changed an updated hardware-specific boot routine can be installed in the read-write memory device to boot the computer system, the processor executing the hardware-specific boot routine to enable the generic operating system to boot the current hardware of the computer system.

28. The computer system of claim 27, wherein the processor patches the generic operating system for compatibility with the current hardware of the computer system when executing the hardware-specific boot routine.

29. The computer system of claim 27, wherein the hardware-specific boot routine is contained in a system enabler file in the read-write memory device.

30. The computer system of claim 29, wherein the processor selects the hardware-specific boot routine from the first at least one boot routine based upon a set of defined selection criteria which includes at least one of:

a) a time-date stamp;

b) a current machine state of the computer system;

c) a preference file; and d) a preferred initial operating state of the computer system.

31. The computer system of claim 30, wherein each of the first at least one boot routine is stored in a system enabler file in the memory.

32. The computer system of claim 30, wherein the processor searches the read-write memory device for the first at least one boot routine.

33. The computer system of claim 27, wherein the processor installs an updated hardware-specific boot routine in the read-write memory device such that, during a boot process of executing a generic operating system, the updated hardware-specific boot routine is selected and executed to complete the boot process.

34. The computer system of claim 33, further comprises: peripherals coupled to the processor;

wherein the updated hardware-specific boot routine is selected depending upon the processor and the peripherals in the boot process.

* * * * *